UNITED STATES PATENT OFFICE.

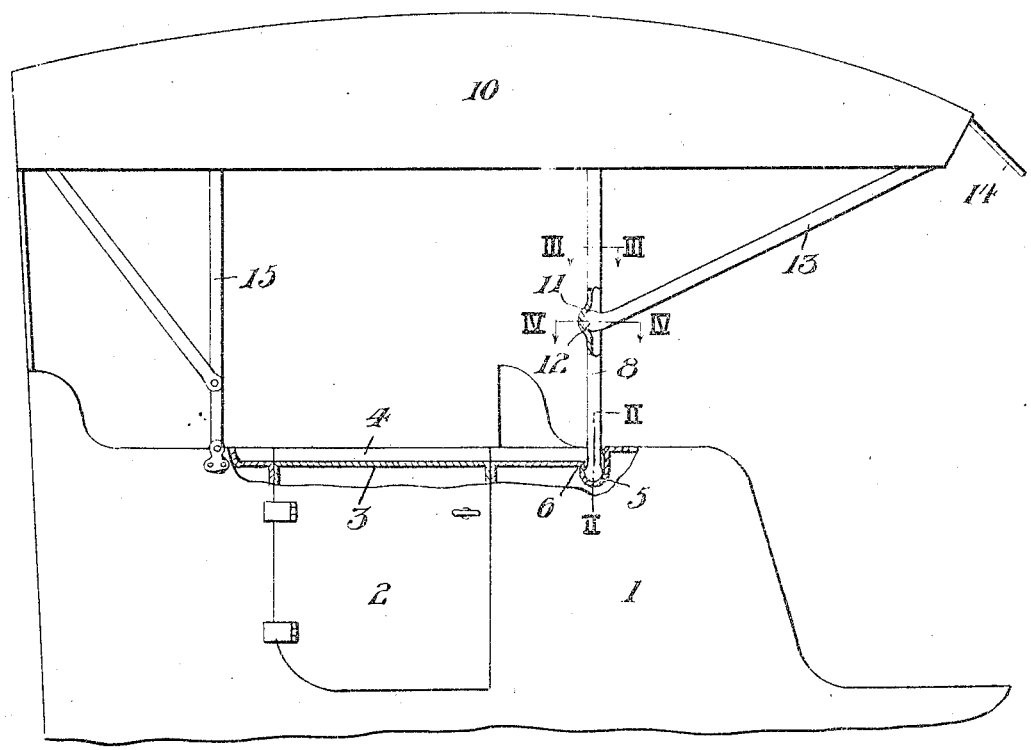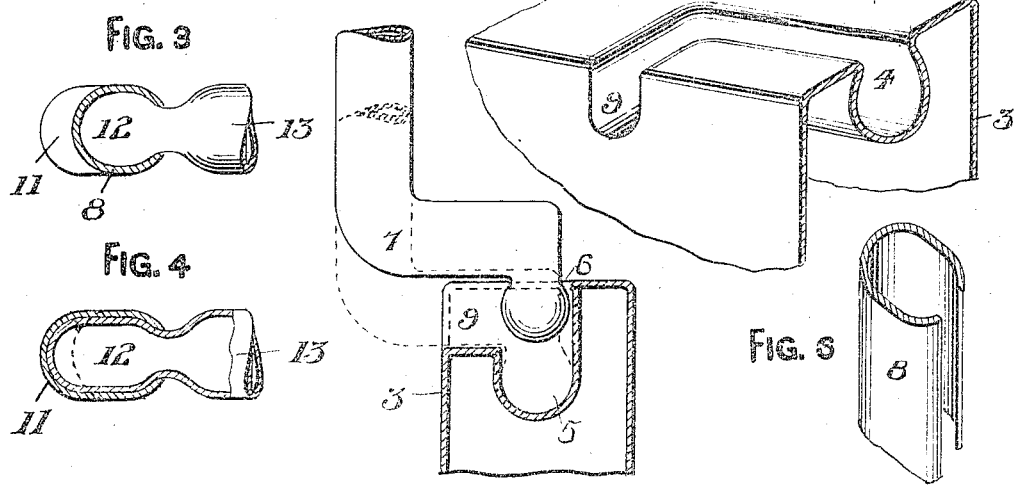

CHARLES E. JONES, OF EAST LIVERPOOL, OHIO.

VEHICLE-HOOD.

1,060,260.

Specification of Letters Patent.

Patented Apr. 29, 1913.

Application filed November 11, 1912. Serial No. 730,667.

*To all whom it may concern:*

Be it known that I, CHARLES E. JONES, a citizen of the United States of America, residing at East Liverpool, in the county of Columbiana and State of Ohio, have invented certain new and useful Improvements in Vehicle-Hoods, of which the following is a specification, reference being had therein to the accompanying drawing.

This invention relates to vehicle hoods, canopies and foldable tops, and the primary object of my invention is to obviate the necessity of using cotter pins, clamps and similar devices for retaining a hood, canopy or foldable top in a raised or set up position, such devices requiring considerable time and labor, especially when a hood canopy or foldable top is to be quickly placed in position to protect the occupants of the vehicle.

Another object of this invention is to furnish a vehicle hood, canopy or foldable top with novel channel members and braces that firmly hold a canopy in a set up position, but permit of the canopy being quickly collapsed or folded.

A further object of this invention is to accomplish the above results by a mechanical construction that is simple, durable, inexpensive to manufacture and applicable to various types of automobiles or other vehicles.

With the above and other objects in view the invention resides in the novel construction, combination and arrangement of parts to be hereinafter specifically described and then claimed.

Reference will now be had to the drawing, wherein:—Figure 1 is a side elevation of a portion of an automobile, partly broken away and partly in section, showing my improvement in connection therewith, Fig. 2 is an enlarged cross sectional view taken on the line II—II of Fig. 1, Fig. 3 is a horizontal sectional view taken on the line III—III of Fig. 1, Fig. 4 is an enlarged horizontal sectional view taken on the line IV—IV of Fig. 1, Fig. 5 is an enlarged perspective view broken away, of a rail forming part of the canopy, and Fig. 6 is an enlarged perspective view, broken away in section, of a channel frame forming part of the canopy.

To put my invention into practice, I provide the sides 1 and the doors 2 of an automobile or vehicle body with channel rails 3 that form channels 4 from a point in proximity to the forward end of the automobile body to a point in proximity to the rear end of said body. The channel rails of the doors 2 are independent of the channel rails of the remainder of the body in order not to interfere with the movement of said doors, the channel rails providing a continuous channel when the doors are closed, as shown in Fig. 1. The channel rails 3, at the forward ends thereof are enlarged to provide sockets 5 at the forward end of each channel, and in communication with said sockets are supporting channels 9. The sockets receive the heads 6 of coupling members 7 that support the frames 8 of a canopy 10. The frames 8 are channel-shaped and intermediate the ends thereof said frames are bulged or enlarged, to provide sockets 11 adapted to receive the heads 12 of canopy braces 13. With the heads 6 and 12 in the sockets 5 and 11 respectively, the canopy 10 is retained in a set up position by ordinary straps 14 employed for this purpose. By releasing the straps 14 the heads 12 can be shifted in the channel of frames 8 to the lower ends of said frames, and then the heads 6 shifted in the channels 4 until the frames 8 are in proximity to the rear frames 15 of the canopy, at which time the canopy can be collapsed or folded in the ordinary and well known manner. The supporting channels 9 accommodate the lower angle ends of the members 7 as shown by dotted lines in Fig. 2.

It is thought that the operation and utility of my invention will be apparent without further description, and I would have it understood that the structural elements are susceptible to such variations and modifications as fall within the scope of the appended claims.

What I claim is:—

1. The combination with an automobile, and a foldable canopy, of channel rails carried by the sides of said automobile and having sockets at the forward ends thereof, channel frames connected to said canopy and adapted to be held at the forward ends of said rails, and braces connected to said canopy and adapted to be held intermediate the ends of said channel frames.

2. The combination with an automobile having a collapsible canopy, of channel rails carried by the sides and doors of said automobile and having sockets at the forward ends thereof in communication with supporting channels, channel canopy frames having the lower ends thereof movable in said rails, and canopy braces having ends thereof movable in said canopy frames and adapted to be held thereby.

In testimony whereof I affix my signature in the presence of two witnesses.

CHARLES E. JONES.

Witnesses:
  C. W. POWELL,
  JOHN H. MOREHEAD.